United States Patent
Sanchez et al.

(10) Patent No.: US 10,057,458 B2
(45) Date of Patent: Aug. 21, 2018

(54) METHOD AND APPARATUS FOR PRINTING IN GRAYSCALE

(71) Applicant: Xerox Corporation, Norwalk, CT (US)

(72) Inventors: James Michael Sanchez, Rochester, NY (US); Guo-Yau Lin, The Woodlands, TX (US)

(73) Assignee: Xerox Corporation, Norwalk, CT (US)

(*) Notice: Subject to any disclaimer, the term of this patent is extended or adjusted under 35 U.S.C. 154(b) by 7 days.

(21) Appl. No.: 14/858,680

(22) Filed: Sep. 18, 2015

(65) Prior Publication Data
US 2017/0085748 A1    Mar. 23, 2017

(51) Int. Cl.
*H04N 1/40* (2006.01)
*H04N 1/60* (2006.01)

(52) U.S. Cl.
CPC ....... *H04N 1/40012* (2013.01); *H04N 1/6008* (2013.01)

(58) Field of Classification Search
CPC .................................................. H04N 1/40012
See application file for complete search history.

(56) References Cited

U.S. PATENT DOCUMENTS

| | | | |
|---|---|---|---|
| 2014/0022570 A1* | 1/2014 | Zeng | H04N 1/6022 358/1.9 |
| 2014/0193067 A1* | 7/2014 | Janssen | H04N 1/40012 382/163 |

* cited by examiner

*Primary Examiner* — King Poon
*Assistant Examiner* — Michael Burleson

(57) ABSTRACT

A method, apparatus and non-transitory computer readable medium for printing in grayscale are disclosed. For example, the method includes receiving a source profile of a color image, converting the source profile into a device specific color space profile, converting the device specific color space profile into a grayscale device specific color space profile that only has black separation values for each output node using a destination profile that is device specific and printing the color image in a grayscale using the grayscale device specific color profile that reproduces a tone of each color of the source profile of the color image.

14 Claims, 3 Drawing Sheets

METHOD AND APPARATUS FOR PRINTING IN GRAYSCALE

The present disclosure relates generally to printing and, more particularly, to an apparatus and method for printing in grayscale.

BACKGROUND

Grayscale printing, in general, enables a user to select a "grayscale" only print option to enable all print job content to render into grayscale. Currently, all object color types, when grayscale printing is selected, are routed through appropriate print paths to achieve the grayscale. Object data content can be red, green and blue (RGB) color, cyan, magenta, yellow and key (CMYK), spot color, and the like and the object type can be images, text, graphic objects and the like.

Some printers use an International Color Consortium (ICC) profile. The ICC profile offers "compression" of tone from the RGB color space to the print space to accommodate the print space's inability to realize an L* (in a CIE lab color space L, a, b) lightness value of zero. This compression tone enables the printing of "shadow detail" viewable on a monitor, but, not physically realizable in print.

In addition, most of the compression from the L, a, b color space is converted into a CMYK color space where C, M and Y still have values. Thus, this is not true grayscale printing.

SUMMARY

According to aspects illustrated herein, there are provided a method, non-transitory computer readable medium and apparatus for printing in grayscale. One disclosed feature of the embodiments is a method that receives a source profile of a color image, converts the source profile into a device specific color space profile, converts the device specific color space profile into a grayscale device specific color space profile that only has black separation values for each output node using a destination profile that is device specific, and prints the color image in a grayscale using the grayscale device specific color profile that reproduces a tone of each color of the source profile of the color image.

Another disclosed feature of the embodiments is a non-transitory computer-readable medium having stored thereon a plurality of instructions, the plurality of instructions including instructions which, when executed by a processor, cause the processor to perform operations that receive a source profile of a color image, convert the source profile into a device specific color space profile, convert the device specific color space profile into a grayscale device specific color space profile that only has black separation values for each output node using a destination profile that is device specific, and print the color image in a grayscale using the grayscale device specific color profile that reproduces a tone of each color of the source profile of the color image.

Another disclosed feature of the embodiments is an apparatus comprising a processor and a computer-readable medium storing a plurality of instructions which, when executed by the processor, cause the processor to perform operations that receive a source profile of a color image, convert the source profile into a device specific color space profile, convert the device specific color space profile into a grayscale device specific color space profile that only has black separation values for each output node using a destination profile that is device specific, and print the color image in a grayscale using the grayscale device specific color profile that reproduces a tone of each color of the source profile of the color image.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a printer and method for printing a secure document. As discussed above, grayscale printing, in general, enables a user to select a "grayscale" only print option to enable all print job content to render into grayscale. Currently, all object color types, when grayscale printing is selected, are routed through appropriate print paths to achieve the grayscale. Object data content can be red, green and blue (RGB) color, cyan, magenta, yellow and key (CMYK), spot color, and the like and the object type can be images, text, graphic objects and the like.

Some printers use an International Color Consortium (ICC) profile. The ICC profile offers "compression" of tone from the RGB color space to the print space to accommodate the print space's inability to realize an L* (in a CIE lab color space L, a, b) lightness value of zero. This compression tone enables the printing of "shadow detail" viewable on a monitor, but, not physically realizable in print.

In addition, most of the compression from the L, a, b color space is converted into a CMYK color space where C, M and Y still have values. Thus, this is not true grayscale printing.

Embodiments of the present disclosure provide a method and apparatus for grayscale printing that provides a true grayscale printing that reproduces the tone of the color profile. For example, the color profile is converted into a grayscale profile that has all zero values except the grayscale value. For example, for a CMYK color space, the grayscale printing would have all 0,0,0,k values to accurately reproduce the tone in the color profile.

Figure 1:
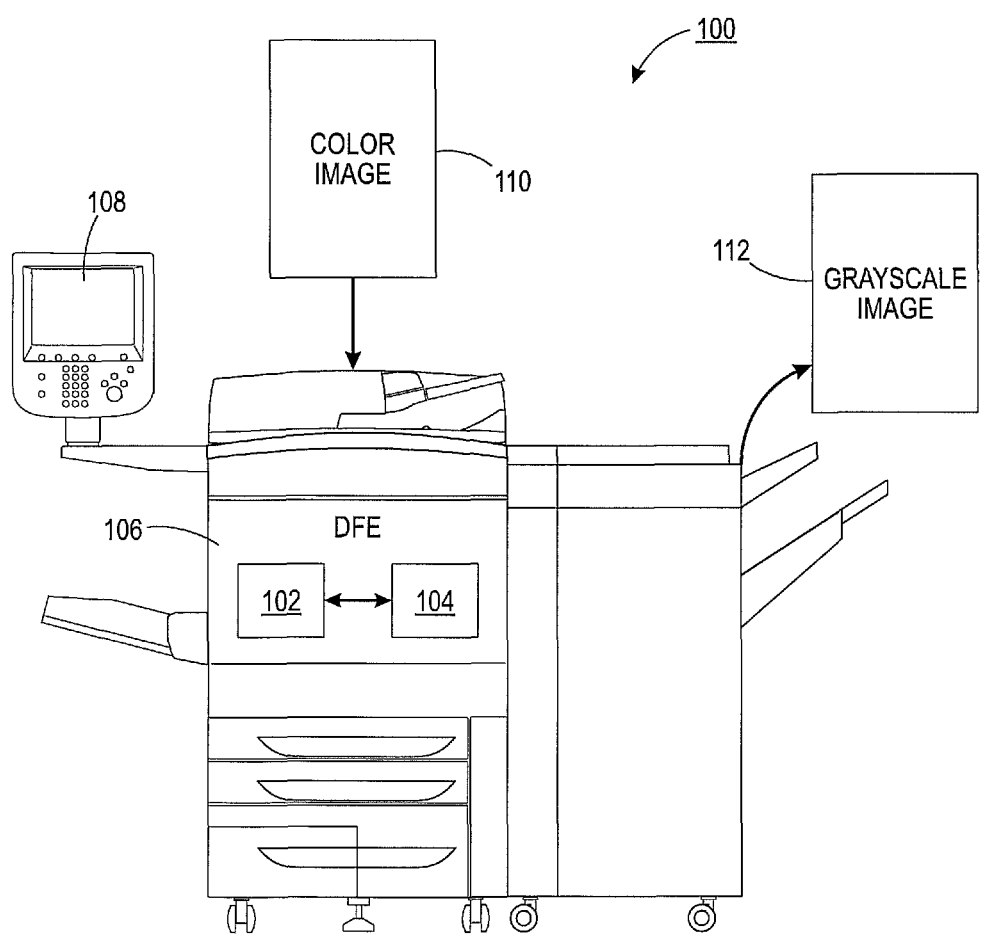
FIG. 1 illustrates an example printer of the present disclosure.

FIG. 1 illustrates an example of a multi-function device (MFD) 100 of the present disclosure. In one embodiment, the MFD 100 may perform multiple functions such as a scanning function, a printing function, a copying function, a faxing function, and the like. The MFD 100 may print in color and grayscale.

In one embodiment, a user may select to copy a color image 110 as a grayscale image 112 using the user interface (UI) 108. The UI 108 may be a touch screen or a key pad. For example, the user may select a print option on the printer 100 and select a grayscale option on the UI 108.

In another embodiment, a digital front end (DFE) 106 of the printer 100 may receive the color image 110 as a print job. For example, another endpoint device such as a desktop computer, a laptop computer, a tablet computer, a smartphone, and the like (not shown) may send a print job including the color image 110. The print job may include a request or instruction to print the color image 110 as a grayscale image 112. The print job containing the color image 110 may be sent via a wired or wireless connection.

In one embodiment, the DFE 106 may include a processor 102 and a memory 104. In one embodiment, the memory 104 may include instructions that when executed by the processor 102 perform the functions described herein. The memory may also include the various profiles described herein and functions for converting one profile into another profile.

For example, memory 104 may contain instructions for converting a source profile in a color space (e.g., red, green and blue (RGB), XYZ, and the like) into a device specific color space profile. In one embodiment, the device specific color space profile may be a 17×17×17 a three dimensional (3D) look up table (LUT) of output nodes.

In one embodiment, the device specific color space profile may be a cyan, magenta, yellow and key (CYMK) color space. As a result, the RGB values of the source profile may be converted into device specific color space profile of CYMK values. Any standard RGB to CYMK conversion program, calculator or algorithm may be used to convert the source profile into the device specific color space profile.

In one embodiment, the memory 104 may also contain a destination profile that is device specific. For example, the destination profile may be specific for each type of MFD 100. In other words, two different MFDs 100 may have two different destination profiles.

In one embodiment, the destination profile may include two separate conversion tables. A first table may convert a device specific color space into a device independent color space or profile connection space (PCS). A second table may convert the device independent color space into a grayscale device specific color space having only a k value. For example, the second table may list a corresponding independent color space value for each k value from 0 to 100. To illustrate, the second table may have a corresponding device independent color space value for a first entry 0,0,0,1, a second entry, 0,0,0,2, and so forth up to 0,0,0,100. In one embodiment, the CYMK values in the first table and the second table may be an 8 bit array from 0 to 255.

In one embodiment, the device independent color space may be an L*, a, b color space. The L represents a lightness value and a and b represent a chroma coordinate value of a corresponding color in the source profile. In one embodiment, the first and second tables of the destination profile may only use the L* value. In other words, the a* and b* values may be set to zero or dropped. Any CYMK to L*, a*, b* color space conversion program, calculator or algorithm may be used to create the first table and the second table.

As a result, the destination profile may be used to convert the device specific color profile into output nodes that only contain k values (e.g., in a format 0,0,0,k) to create a grayscale device specific color profile that can be used to print the grayscale image 112 from the color image 110 while reproducing the tones of each color of the color image 110.

To illustrate, an RGB color value of the source profile of the color image 110 may have a cyan color of 100,0,0,50 for an output node of the device specific color value. Thus, one output node of the device specific color value may be 100,0,0,50. The destination profile may then be used to replace the output node with a CYMK value that only has a k value. In other words, the cyan value is changed to zero.

For example, the first table of the destination profile may be used to convert the cyan color 100,0,0,50 into the device independent color space having a particular L* value, a* value and b* value. The L* value may be used to find a corresponding k value of 0,0,0,k in the second table. When a match is found, the output node having the cyan color 100,0,0,50 may be replaced with the corresponding k value of 0,0,0,k. In one embodiment, if an exact match is not found, an extrapolation may be calculated to estimate the corresponding 0,0,0,k value associated with an L* value.

The process described above may be repeated for each output node of the device specific color profile to create the grayscale device specific color profile. In other words, when the conversion is completed, each output node of the grayscale device specific color profile will have a 0,0,0,k value. In other words, each output node will be in a CYMK color space where the C value, the Y value and the M value are zero and only K has non-zero value. The grayscale device specific color profile that only has grayscale values for each output node may then be used to print the grayscale image 112.

In contrast, prior grayscale printing techniques would still have non-zero values for the C value, the Y value and/or the M value. As a result, the grayscale conversion of the present disclosure provides true grayscale printing. However, the grayscale conversion of the present disclosure still maintains or reproduces a tone of each color of the source profile of the color image 110.

It should be noted that although the device specific color space and profile are described with respect to a CMYK color space, other color spaces may also be used. For example, five color destination profiles (e.g., cyan, magenta, yellow, key, gold (CMYKG)) may also be used.

Figure 2:
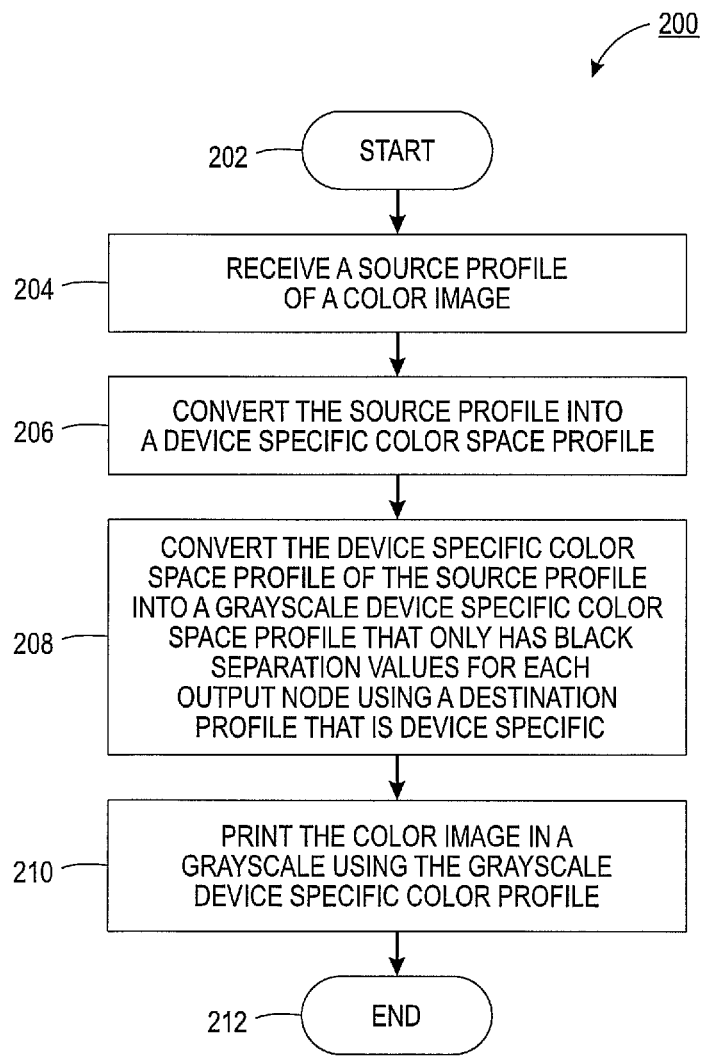
FIG. 2 illustrates an example flowchart of a method for printing in grayscale.
Figure 3:
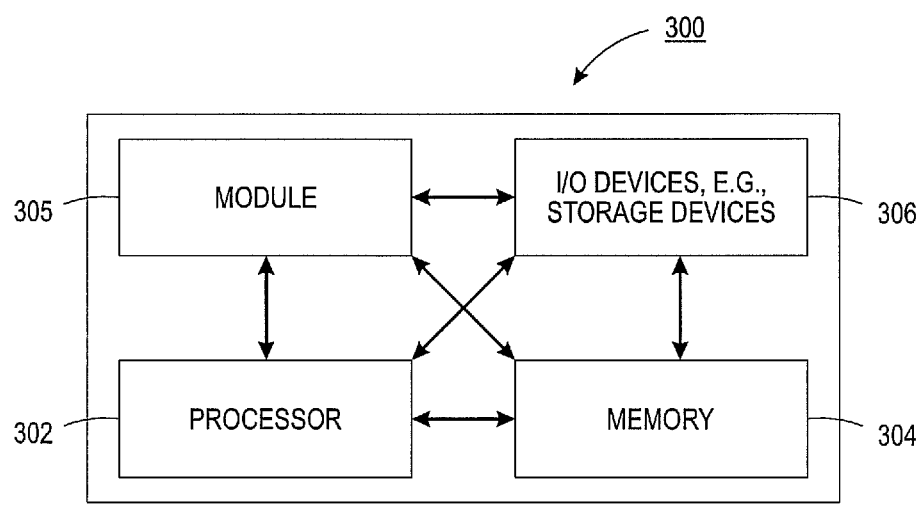
FIG. 3 illustrates a high-level block diagram of a computer suitable for use in performing the functions described herein.

FIG. 2 illustrates a flowchart of a method 200 for printing a secure document. In one embodiment, one or more steps, or operations, of the method 200 may be performed by the DFE 106 or the processor 102 of the MFD 100 or a computer as illustrated in FIG. 3 and discussed below.

At block 202 the method 200 begins. At block 204, the method 200 receives a source profile of a color image. In one embodiment, the source profile may be in any color space (e.g., an RGB space, a XYZ space, and the like). A user may have selected an option to print or to copy the color image into a grayscale image.

At block 206 the method 200 converts the source profile into a device specific color space profile. In one embodiment, the device specific color space profile may be a cyan, magenta, yellow and key (CYMK) color space. As a result, the RGB values of the source profile may be converted into device specific color space profile of CYMK values. In one embodiment, the device specific color space profile may be a 17×17×17 a three dimensional (3D) look up table (LUT) of output nodes.

At block 208, the method 200 converts the device specific color space profile into a grayscale device specific color space profile that only has black separation values for each output node using a destination profile that is device specific. For example, different devices may reproduce the tone or an RGB color image differently. The destination profile may be specific for each particular device.

In one embodiment, the destination profile may include two separate conversion tables. A first table may convert a device specific color space into a device independent color space or profile connection space (PCS). A second table may convert the device independent color space into a grayscale device specific color space having only a k value. For example, the second table may list a corresponding independent color space value for each k value from 0 to 100. To illustrate, the second table may have a corresponding device independent color space value for a first entry 0,0,0,1, a second entry, 0,0,0,2, and so forth up to 0,0,0,100. In one embodiment, the CYMK values in the first table and the second table may be an 8 bit array from 0 to 255.

In one embodiment, the device independent color space may be an L*, a, b color space. The L represents a lightness value and a and b represent a chroma coordinate value of a corresponding color in the source profile. In one embodiment, the first and second tables of the destination profile may only use the L* value. In other words, the a* and b* values may be set to zero or dropped.

As a result, the destination profile may be used to convert the device specific color profile into output nodes that only contain k values (e.g., in a format 0,0,0,k) to create a grayscale device specific color profile that can be used to print the grayscale image from the color image while reproducing the tones of each color of the color image.

To illustrate, an RGB color value of the source profile of the color image 110 may have a cyan color of 100,0,0,50 for an output node of the device specific color value. Thus, one output node of the device specific color value may be 100,0,0,50. The destination profile may then be used to replace the output node with a CYMK value that only has a k value. In other words, the cyan value is changed to zero.

For example, the first table of the destination profile may be used to convert the cyan color 100,0,0,50 into the device independent color space having a particular L* value, a* value and b* value. The L* value may be used to find a corresponding k value of 0,0,0,k in the second table. When a match is found, the output node having the cyan color 100,0,0,50 may be replaced with the corresponding k value of 0,0,0,k. In one embodiment, if an exact match is not found, an extrapolation may be calculated to estimate the corresponding 0,0,0,k value associated with an L* value.

The process described above may be repeated for each output node of the device specific color profile to create the grayscale device specific color profile. In other words, when the conversion is completed, each output node of the grayscale device specific color profile will have a 0,0,0,k value. In other words, each output node will be in a CYMK color space where the C value, the Y value and the M value are zero and only K has non-zero value.

At block 210, the method 200 print the color image in a grayscale using the grayscale device specific color profile. The grayscale may reproduce the tone of each color of the source profile of the color image, while being a true grayscale image. In other words, the grayscale values may be printed with only k values in the CYMK color space. Said another way, the grayscale device specific color profile has a value of zero for all C values, Y values and M values. At block 212 the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a computer that can be transformed to into a machine that is dedicated to perform the functions described herein. As depicted in FIG. 3, the computer 300 comprises one or more hardware processor elements 302 (e.g., a central processing unit (CPU), a microprocessor, or a multi-core processor), a memory 304, e.g., random access memory (RAM) and/or read only memory (ROM), a module 305 for printing in grayscale, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for printing in grayscale (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for printing in grayscale (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing in grayscale, comprising:

receiving, by a processor, a source profile of a color image;

converting, by the processor, the source profile into a device specific color space profile;

converting, by the processor, the device specific color space profile into a grayscale device specific color space profile that only has black separation values for each output node using a destination profile that is device specific, wherein the destination profile comprises a first table for converting a device specific color space to a device independent color space and a second table for converting only k values of the device specific color space to the device independent color space using only a lightness value of the device independent color space, wherein the device independent color space comprises an L*, a*, b* color space, wherein L* represents the lightness value and a* and b* represent a chroma coordinate value of a corresponding color in the source profile, wherein the converting the device specific color space profile into the grayscale device specific color space profile using only the lightness value of the device independent color space comprises:

finding, by the processor, a corresponding L* value, a* value and b* value for each color of the device specific color space profile using the first table;

setting, by the processor, the a* value and the b* value to zero;

finding, by the processor, a matching L* value in the second table; and replacing, by the processor, each color of the device specific color space profile with a corresponding 0,0,0,k value to create the grayscale device specific color space profile; and printing, by the processor, the color image in a grayscale using the grayscale device specific color space profile that reproduces a tone of each color of the source profile of the color image.

2. The method of claim 1, wherein the source profile comprises a red, green, blue color profile.

3. The method of claim 1, further comprising:

extrapolating, by the processor, the corresponding 0,0,0,k value when the matching L* value is not found in the second table.

4. The method of claim 1, wherein the device specific color space profile comprises a cyan, magenta, yellow and key (CMYK) color space.

5. The method of claim 4, wherein the CMYK color space comprises an 8 bit array from 0 to 255.

6. The method of claim 1, wherein the device specific color space profile and the grayscale device specific color space profile comprise a 17×17×17 three dimensional look up table of output nodes.

7. A non-transitory computer-readable medium storing a plurality of instructions, which when executed by a processor, cause the processor to perform operations for printing in grayscale, the operations comprising:

receiving a source profile of a color image;

converting the source profile into a device specific color space profile;

converting the device specific color space profile into a grayscale device specific color space profile that only has black separation values for each output node using a destination profile that is device specific, wherein the destination profile comprises a first table for converting a device specific color space to a device independent color space and a second table for converting only k values of the device specific color space to the device independent color space using only a lightness value of the device independent color space, wherein the device independent color space comprises an L*, a*, b* color space, wherein L* represents the lightness value and a* and b* represent a chroma coordinate value of a corresponding color in the source profile, wherein the converting the device specific color space profile into the grayscale device specific color space profile using only the lightness value of the device independent color space comprises:

finding a corresponding L* value, a* value and b* value for each color of the device specific color space profile using the first table;

setting the a* value and the b* value to zero;

finding a matching L* value in the second table; and replacing each color of the device specific color space profile with a corresponding 0,0,0,k value to create the grayscale device specific color space profile; and printing the color image in a grayscale using the grayscale device specific color space profile that reproduces a tone of each color of the source profile of the color image.

8. The non-transitory computer-readable medium of claim 7, wherein the source profile comprises a red, green, blue color profile.

9. The non-transitory computer-readable medium of claim 7, further comprising:

extrapolating the corresponding 0,0,0,k value when the matching L* value is not found in the second table.

10. The non-transitory computer-readable medium of claim 7, wherein the device specific color space profile comprises a cyan, magenta, yellow and key (CMYK) color space.

11. The non-transitory computer-readable medium of claim 10, wherein the CMYK color space comprises an 8 bit array from 0 to 255.

12. The non-transitory computer-readable medium of claim 7, wherein the device specific color space profile and the grayscale device specific color space profile comprise a 17×17×17 three dimensional look up table of output nodes.

13. A method for printing in grayscale, comprising:

receiving, by a processor, a source profile in a red, green, blue (RGB) color space of a color image;

converting, by the processor, the source profile into a device specific color space profile for each output node of the device specific color space profile, the device specific color space profile comprising a cyan, magenta, yellow, key (CYMK) color space;

converting, by the processor, each output node of the device specific color space profile into a device independent color space comprising an L*, a*, b* color space, wherein L* represents a lightness value and a* and b* represent a chroma coordinate value of a corresponding color in the source profile using a first table of a destination profile that is device specific;

setting, by the processor, the a* value and the b* value to zero;

determining, by the processor, a 0,0,0,k value using a second table of the destination profile that is device specific based upon only an L* value for the each output node of the device specific color space profile;

replacing, by the processor, the each output node of the device specific color space profile with the 0,0,0,k value to create a grayscale device specific color space profile; and printing, by the processor, the color image in a grayscale using the grayscale device specific color space profile that reproduces a tone of each color of the source profile of the color image.

14. The method of claim 13, wherein the 0,0,0,k value is extrapolated when no exact match between the L* value in the first table and the second table is found.

* * * * *